(12) United States Patent
Chuang

(10) Patent No.: US 8,280,615 B2
(45) Date of Patent: Oct. 2, 2012

(54) AIR INLET SYSTEM OF ENGINE

(75) Inventor: Tzu-Nan Chuang, Changhua County (TW)

(73) Assignee: Tzunan Chuang, Changhua County (TW)

( * ) Notice: Subject to any disclaimer, the term of this patent is extended or adjusted under 35 U.S.C. 154(b) by 191 days.

(21) Appl. No.: 12/695,149

(22) Filed: Jan. 27, 2010

(65) Prior Publication Data

US 2011/0180036 A1  Jul. 28, 2011

(51) Int. Cl.
F02B 33/34 (2006.01)
F02M 29/02 (2006.01)
F02D 41/26 (2006.01)

(52) U.S. Cl. ......... 701/110; 123/399; 123/565; 123/592

(58) Field of Classification Search .................. 123/337, 123/350, 361, 399, 590, 592, 565, 703; 701/110; 73/114.31, 114.32, 114.36
See application file for complete search history.

(56) References Cited

U.S. PATENT DOCUMENTS

| | | | | |
|---|---|---|---|---|
| 4,724,817 A * | 2/1988 | Cook | ............................ | 123/565 |
| 5,586,540 A * | 12/1996 | Marzec et al. | ............. | 123/559.1 |
| 6,209,528 B1 * | 4/2001 | Kondo | ............................ | 123/565 |
| 6,295,974 B1 * | 10/2001 | McCants | ....................... | 123/565 |
| 6,318,085 B1 * | 11/2001 | Torno et al. | ...................... | 60/611 |
| 6,769,411 B2 * | 8/2004 | Fabiani | ......................... | 123/478 |
| 6,817,349 B2 * | 11/2004 | Awasaka et al. | ............. | 123/564 |
| 6,880,516 B2 * | 4/2005 | Maier et al. | ............... | 123/198 E |
| 7,107,974 B2 * | 9/2006 | Yang | ............................ | 123/565 |
| 7,665,450 B2 * | 2/2010 | Hong | ............................. | 123/592 |
| 7,971,581 B1 * | 7/2011 | Guilas | ........................... | 123/592 |
| 2004/0221837 A1 * | 11/2004 | Kassner | ......................... | 123/565 |
| 2006/0112939 A1 * | 6/2006 | Wu | ................................. | 123/565 |
| 2006/0137664 A1 * | 6/2006 | McCoy | ........................... | 123/565 |

FOREIGN PATENT DOCUMENTS

JP  2011-157909  *  8/2011

* cited by examiner

*Primary Examiner* — Hai Huynh
(74) *Attorney, Agent, or Firm* — CKC & Partners Co., Ltd.

(57) ABSTRACT

An air inlet system of an engine includes a throttle, a fan, a motor, and a throttle sensor. The fan is connected to the throttle. The motor is for driving the fan to force air into at least one intake manifold of the engine through the throttle. The throttle sensor is for controlling the rotational speed of the fan according to the motion of a throttle pedal.

16 Claims, 4 Drawing Sheets

AIR INLET SYSTEM OF ENGINE

BACKGROUND

1. Technical Field

The present disclosure relates to fluid handling devices.

2. Description of Related Art

A standard air intake works by sucking warm air into the engine, which it can then use to oxygenate the gas inside of it. Of course, this is done to cause an ignition, providing the power the engine needs to run. Common air intakes may be fairly long, with several twists or chambers to help stifle their loud sound. While a quieter engine is probably ideal for most people, others are not satisfied with stock air intakes, most of which do not take full advantage of a vehicle's potential horsepower.

SUMMARY

According to one embodiment, an air inlet system of an engine includes a throttle, a fan, a motor, and a throttle sensor. The fan is connected to the throttle. The motor can drive the fan to force air into at least one intake manifold of the engine through the throttle. The throttle sensor can control the rotational speed of the fan according to the motion of a throttle pedal.

According to another embodiment, an air inlet system of an engine includes a throttle, a fan, a motor, and a throttle sensor. The throttle includes a throttle body, a throttle plate, and at least one throttle linkage. The throttle plate is housed in the throttle body. The throttle linkage connects the throttle plate to a throttle cable. The fan is connected to the throttle. The motor can drive the fan to force air into at least one intake manifold of the engine through the throttle. The throttle sensor can control the rotational speed of the fan according to the motion of the throttle plate of the throttle.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
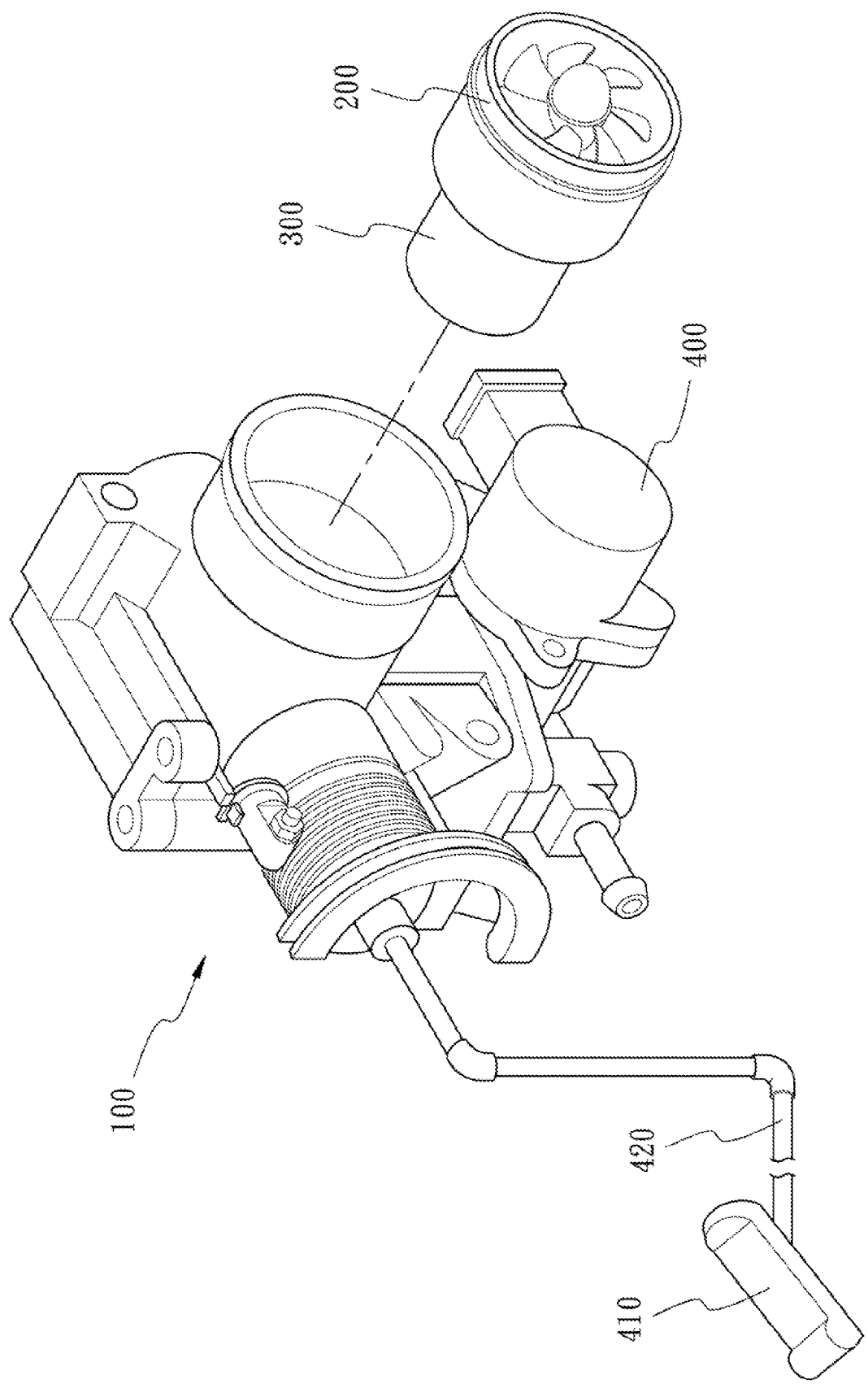
FIG. 1 is a perspective view of an air inlet system of an engine according to one embodiment.

FIG. 1 is a perspective view of an air inlet system of an engine according to one embodiment. The air inlet system of the engine includes a throttle 100, a fan 200, a motor 300, and a throttle sensor 400. The fan 200 is connected to the throttle 100. The motor 300 can drive the fan 200 to force air into at least one intake manifold of the engine through the throttle 100. The throttle sensor 400 can control the rotational speed of the fan 200 according to the motion 300 of a throttle pedal 410.

In use, the air and fuel can be mixed well because the rotational speed of the fan 200 is controlled according to the motion of the throttle pedal 410. Thus, the engine can run smoothly under the condition of oxygen deficiency or when starting.

In one or more embodiment, the motor 300 may be a brushless motor for the following reasons. First, the brushless motor has a small size, such that air can flow through a larger area without being blocked by the motor 300. Second, the brushless motor has a longer lifetime (no brush erosion). On the other hand, the energy consumption of the brushless motor is less than a turbine supercharger, so the air inlet system of the engine can be assembled to almost all kind of cars.

More particularly, the motor 300 may be a continuously variable speed motor. Accordingly, the car will have a better acceleration performance.

The throttle sensor 400 can control the rotational speed of the fan 200 according to the motion 300 of the throttle pedal 410. That is, at the same time of stepping on the throttle pedal 410, the fan 200 shows relative rotational speed according to the motion of a throttle pedal 410. In other words, the larger the motion of the throttle pedal 410 the faster the fan 200 rotates.

Figure 2:
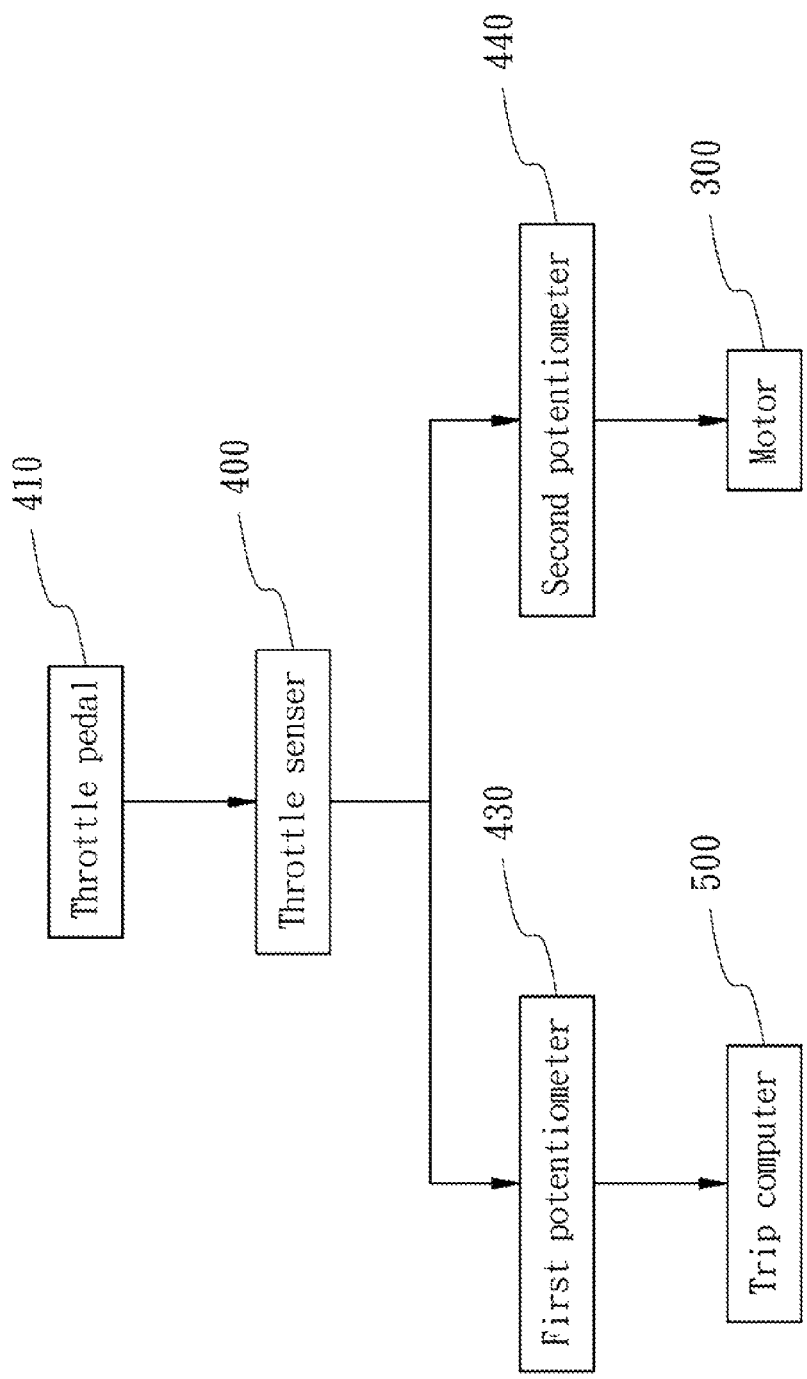
FIG. 2 is a functional block diagram of the throttle sensor of FIG. 1.

FIG. 2 is a functional block diagram of the throttle sensor of FIG. 1. The throttle sensor 400 has a first potentiometer 430 and a second potentiometer 440. The first potentiometer 430 is communicated with the throttle pedal 410 for providing the motion of the throttle pedal 410 to a trip computer 500. The second potentiometer 440 is communicated with the throttle pedal 410 for controlling the rotational speed of the fan 200 according to the motion of the throttle pedal 410. Thus, separating the signal of the trip computer 500 and the motor 300 not only avoids the signal interference but reinforces the signal strength.

Figure 3:
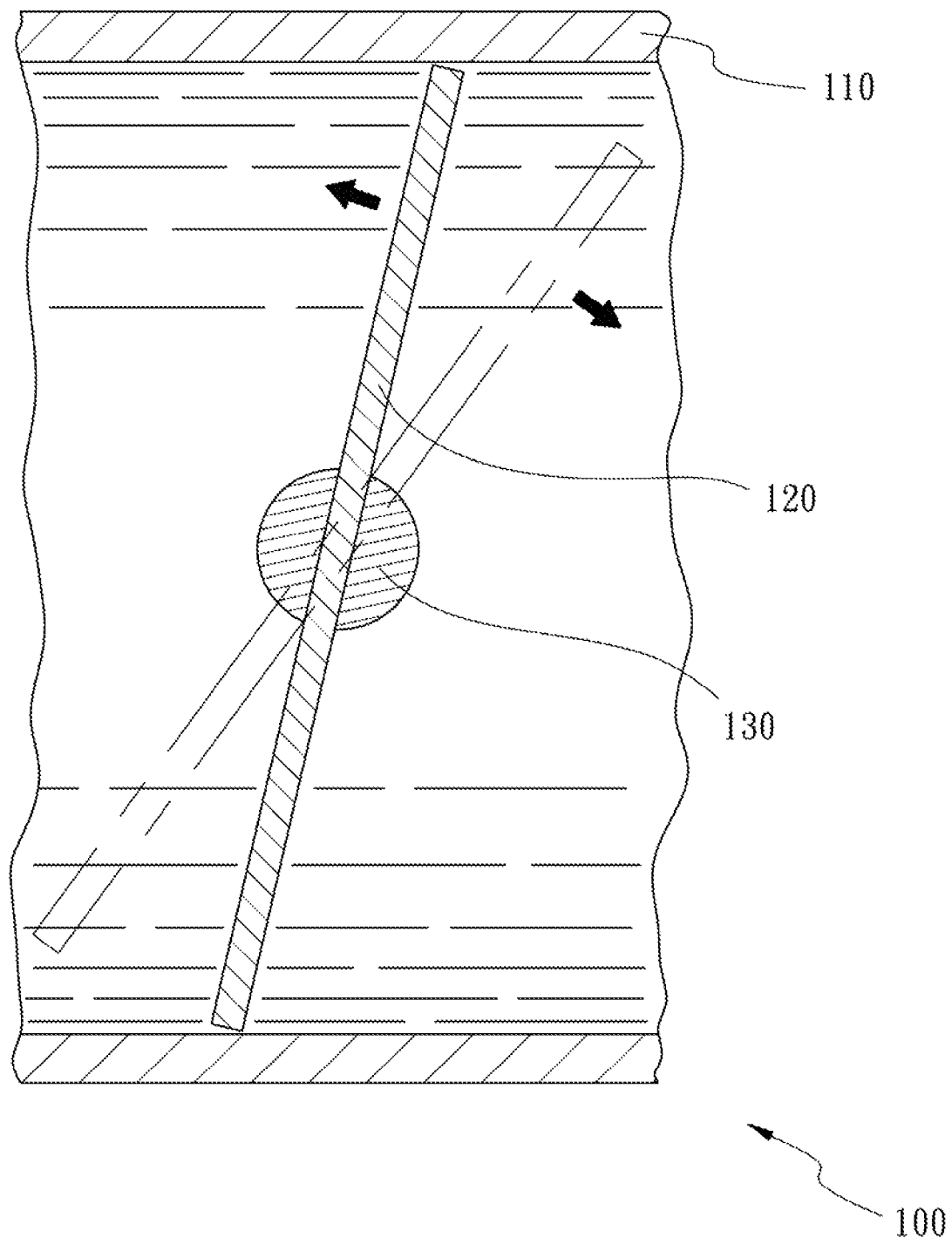
FIG. 3 is a sectional view of the throttle of FIG. 1.

FIG. 3 is a sectional view of the throttle of FIG. 1. The throttle 100 includes a throttle body 110, a throttle plate 120, and a throttle linkage 130.

The throttle plate 120 is housed in the throttle body 110. The throttle linkage 130 is connecting the throttle plate 120 to a throttle cable 420. The throttle cable 420 connects the throttle pedal 410 to the throttle linkage 130, and the throttle sensor 400 is connected to the throttle linkage 130. At the same time of stepping on the throttle pedal 410, the fan 200 shows relative rotational speed according to the opening degree of the throttle plate 120. That is, the throttle sensor 400 can control the rotational speed of the fan 200 according to the motion 300 of the throttle plate 120.

Figure 4:
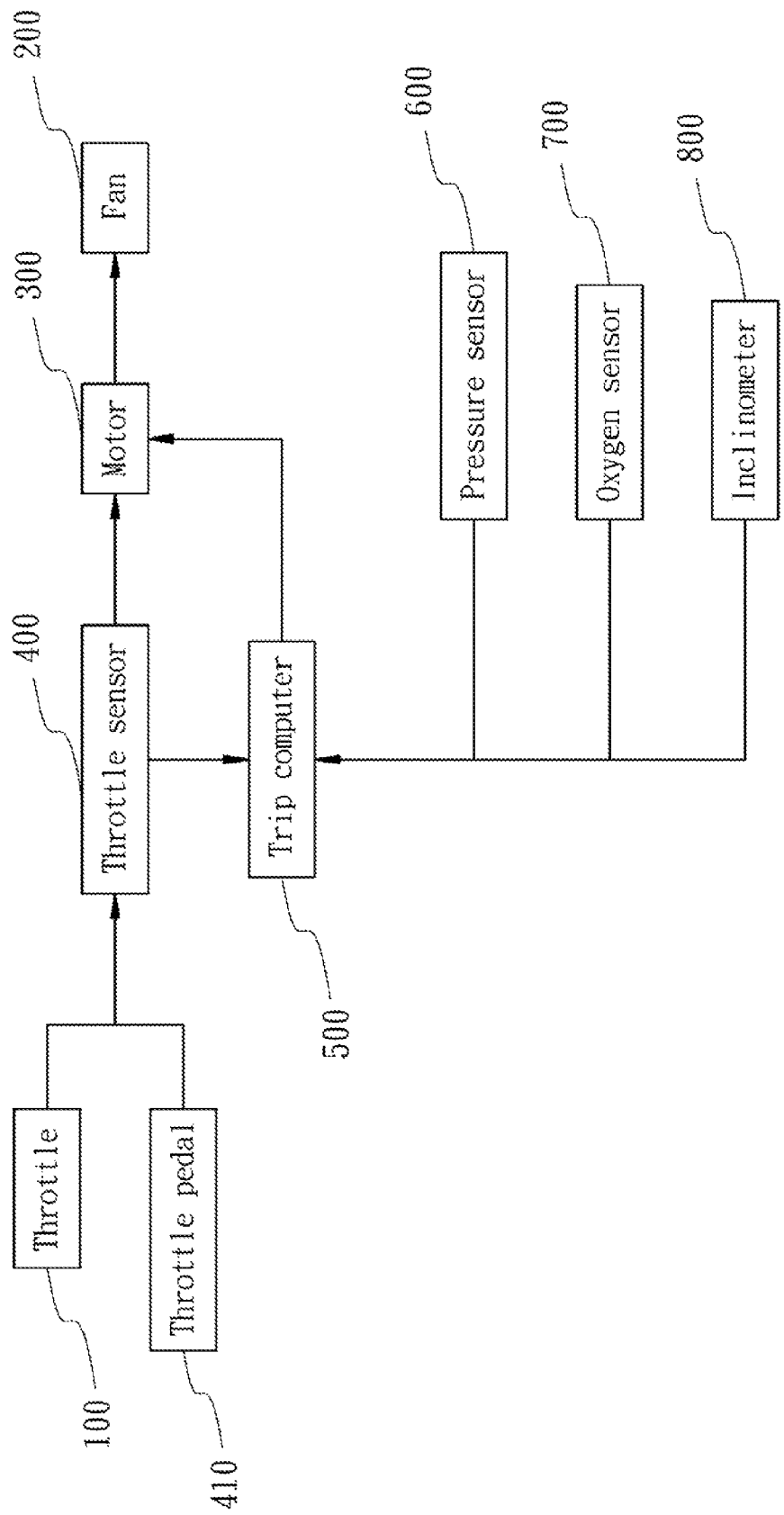
FIG. 4 is a functional block diagram of the air inlet system of the engine of FIG. 1.

FIG. 4 is a functional block diagram of the air inlet system of engine of FIG. 1. The air inlet system of the engine includes a trip computer 500. The trip computer 500 adjusts the rotational speed of the fan 200 according to the data in the trip computer 500. In addition to cut down the time of adjusting the rotational speed of the fan 200 but raise the efficiency of the engine as well.

The trip computer 500 is programmed to adjust the rotational speed of the fan 200 according to the rotational speed of the engine, the speed of a car carrying the engine, and/or whether combustion in the engine is complete or not. On the other hand, by assembling the extra sensors, such as pressure sensor 600 detects the pressure of the intake manifold of the engine, oxygen sensor 700 detects oxygen concentration in the exhaust manifold of the engine and inclinometer 800 detects the tilt angle of the car carrying the engine. The trip computer 500 adjusts the rotational speed of the fan 200 by reading in the data of the extra sensors.

TABLE 1

| Rotational speed of the engine (rpm) | Consumptive current of the motor (A) | Energy consumption of the motor (W) |
|---|---|---|
| Below 1500 | 0 | 0 |
| 1500~2000 | 8 | 104 |
| 2000 | 12 | 144 |
| 3000 | 20 | 260 |

According to the data in the table 1, the motor 300 does not operate when the rotational speed of the engine is below 1500 rpm. Therefore, the motor 300 of the air inlet system of the engine does not affect the original efficiency of the car. The motor 300 needs 104 W and 8 A when the rotational speed of the engine is between 1500 rpm to 2000 rpm. The motor 300 needs 144 W and 12 A when the rotational speed of the engine is around 2000 rpm. The motor 300 needs 260 W and 20 A when the rotational speed of the engine is around 3000 rpm. To sum up, only when the car suddenly accelerated or drives on the mountain, in other words, when the rotational speed of the engine is beyond 1500 rpm, the motor 300 starts to operate. The motor 300 adjusts the rotational speed of the fan 200 to reach the best condition of the engine by reading in the data of the rotational speed of the engine.

Applying the air inlet system of the engine not only increases the filling rate of the air but runs smoothly under the condition of oxygen deficiency or when starting. The brushless motor has a longer lifetime (no brush erosion). It is more convenient to assemble the air inlet system of the engine in all kinds of cars. Moreover, the throttle sensor 400 controls the rotational speed of the fan 200 directly, not only avoids the signal interference with the trip computer 500 but also reinforces the signal strength.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An air inlet system of an engine, comprising:
   a throttle;
   a fan connected to the throttle;
   a motor for driving the fan to force air into at least one intake manifold of the engine through the throttle; and
   a throttle sensor for controlling the rotational speed of the fan according to the motion of a throttle pedal, wherein the motor is a brushless motor.

2. The air inlet system of the engine of claim 1, wherein the throttle comprises:
   a throttle body;
   a throttle plate housed in the throttle body; and
   at least one throttle linkage connecting the throttle plate to a throttle cable, wherein the throttle cable connects the throttle pedal to the throttle linkage, and the throttle sensor is connected to the throttle linkage.

3. The air inlet system of the engine of claim 1, wherein the throttle sensor comprises:
   a first potentiometer communicated with the throttle pedal for providing the motion of the throttle pedal to a trip computer; and
   a second potentiometer communicated with the throttle pedal for controlling the rotational speed of the fan according to the motion of the throttle pedal.

4. The air inlet system of the engine of claim 1, further comprising:
   a trip computer programmed to adjust the rotational speed of the fan according to the rotational speed of the engine.

5. The air inlet system of the engine of claim 1, further comprising:
   a trip computer programmed to adjust the rotational speed of the fan according to the speed of a car carrying the engine.

6. The air inlet system of the engine of claim 1, further comprising:
   a pressure sensor for detecting the pressure of the intake manifold of the engine; and
   a trip computer programmed to adjust the rotational speed of the fan according to the pressure of the intake manifold of the engine.

7. The air inlet system of engine of claim 1, further comprising:
   a trip computer programmed to adjust the rotational speed of the fan according to whether combustion in the engine is complete or not.

8. The air inlet system of engine of claim 1, further comprising:
   an oxygen sensor for detecting oxygen concentration in at least one exhaust manifold of the engine; and
   a trip computer programmed to adjust the rotational speed of the fan according to the oxygen concentration in the exhaust manifold of the engine.

9. The air inlet system of the engine of claim 1, further comprising:
   an inclinometer for detecting the tilt angle of a car carrying the engine; and
   a trip computer programmed to adjust the rotational speed of the fan according to the tilt angle of the car carrying the engine.

10. An air inlet system of an engine, comprising:
    a throttle comprising:
    a throttle body;
    a throttle plate housed in the throttle body; and
    at least one throttle linkage connecting the throttle plate to a throttle cable;
    a fan connected to the throttle;
    a motor for driving the fan to force air into at least one intake manifold of the engine through the throttle; and
    a throttle sensor for controlling the rotational speed of the fan according to the motion of the throttle plate of the throttle, wherein the motor is a brushless motor.

11. The air inlet system of the engine of claim 10, wherein the throttle sensor comprises:
    a first potentiometer communicated with a throttle pedal for providing the motion of the throttle pedal to a trip computer; and
    a second potentiometer communicated with the throttle pedal for controlling the rotational speed of the fan according to the motion of a throttle pedal.

12. The air inlet system of the engine of claim 10, further comprising:
    a trip computer programmed to adjust the rotational speed of the fan according to the rotational speed of the engine.

13. The air inlet system of the engine of claim 10, further comprising:
    a pressure sensor for detecting the pressure of the intake manifold of the engine; and
    a trip computer programmed to adjust the rotational speed of the fan according to the pressure bf the intake manifold of the engine.

14. The air inlet system of the engine of claim 10, further comprising:
   a trip computer programmed to adjust the rotational speed of the fan according to whether combustion in the engine is complete or not.

15. The air inlet system of the engine of claim 10, further comprising:
   an oxygen sensor for detecting oxygen concentration in at least one exhaust manifold of the engine; and
   a trip computer programmed to adjust the rotational speed of the fan according to the oxygen concentration in the exhaust manifold of the engine.

16. The air inlet system of the engine of claim 10, further comprising:
   an inclinometer for detecting the tilt angle of a car carrying the engine; and
   a trip computer programmed to adjust the rotational speed of the fan according to the tilt angle of the car carrying the engine.

\* \* \* \* \*